United States Patent
Gondre et al.

(10) Patent No.: US 11,168,567 B2
(45) Date of Patent: Nov. 9, 2021

(54) FIBROUS TEXTURE FOR PRODUCING A FAN BLADE MADE OF COMPOSITE MATERIAL

(71) Applicant: SAFRAN AIRCRAFT ENGINES, Paris (FR)

(72) Inventors: Guillaume Pascal Jean-Charles Gondre, Moissy-Cramayel (FR); Thomas Alain De Gaillard, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 114 days.

(21) Appl. No.: 16/596,232

(22) Filed: Oct. 8, 2019

(65) Prior Publication Data
US 2020/0109634 A1     Apr. 9, 2020

(30) Foreign Application Priority Data
Oct. 9, 2018  (FR) ...................................... 1859342

(51) Int. Cl.
*F01D 5/14* (2006.01)
(52) U.S. Cl.
CPC ........ *F01D 5/147* (2013.01); *F05D 2300/614* (2013.01)
(58) Field of Classification Search
CPC .... F01D 5/147; F01D 5/282; F05D 2300/614; F05D 2300/6034; B29L 2031/082
See application file for complete search history.

(56) References Cited

U.S. PATENT DOCUMENTS 5,279,892 A     1/1994  Baldwin et al.
6,471,485 B1 *  10/2002 Rossmann ............. F01D 5/282
                                                416/230

(Continued)

FOREIGN PATENT DOCUMENTS

| EP | 3 287 265 A1 | 2/2018 |
| EP | 3 292 991 A1 | 3/2018 |
| WO | WO 2006/136755 A2 | 12/2006 |

OTHER PUBLICATIONS

Search Report as issued in French Patent Application No. 1859342, dated Jun. 7, 2019.

*Primary Examiner* — Courtney D Heinle
*Assistant Examiner* — Danielle M. Christensen
(74) *Attorney, Agent, or Firm* — Pillsbury Winthrop Shaw Pittman LLP

(57) ABSTRACT

A fibrous texture to form the fibrous reinforcement of a turbomachine blade made of composite material, the texture being made in one piece and having a three-dimensional weaving, and includes blade root, blade airfoil and blade support portions. The blade support portion includes a first area extending transversely from a first edge of the texture to form a leading edge and a second area extending transversely from the first area up to a second edge of the texture to form a trailing edge, the first area including warp yarns or strands made of second fibers different from the first fibers, the second fibers having an elongation at break greater than that of the first fibers, the first area having a first volume ratio in yarns or strands made of second fibers strictly greater than a second volume ratio in yarns or strands made of second fibers in the second area.

9 Claims, 4 Drawing Sheets

(56) References Cited

U.S. PATENT DOCUMENTS

| | | | |
|---|---|---|---|
| 2011/0293435 A1* | 12/2011 | McMillan | B29C 70/222 |
| | | | 416/230 |
| 2013/0224035 A1* | 8/2013 | Alexander | F01D 5/282 |
| | | | 416/230 |
| 2018/0045207 A1* | 2/2018 | Paquin | B32B 3/263 |

* cited by examiner

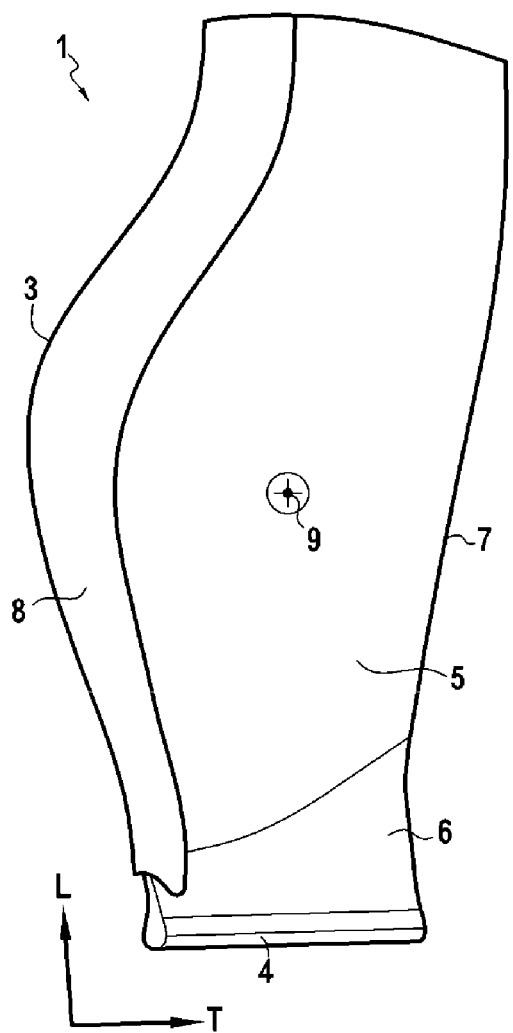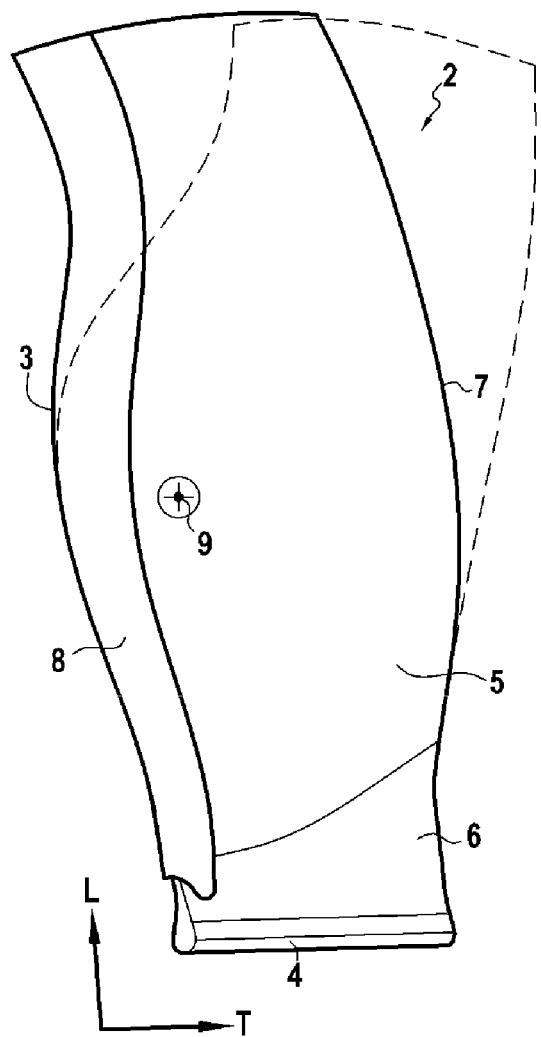
FIG.1 PRIOR ART
FIG.2

FIBROUS TEXTURE FOR PRODUCING A FAN BLADE MADE OF COMPOSITE MATERIAL

CROSS-REFERENCE TO RELATED APPLICATIONS

This application claims priority to French Patent Application No. 1859342, filed Oct. 9, 2018, the entire content of which is incorporated herein by reference in its entirety.

FIELD

The present invention relates to the general field of aeronautical turbomachines, and concerns more particularly a fibrous texture intended to form the fibrous reinforcement of a turbomachine blade made of composite material. Such a blade can be used in an aeronautical turbomachine fan.

BACKGROUND

Previously made of metal material, the blades of the fan are now made of composite material that is to say from a fibrous preform densified by an organic matrix, which makes it possible to produce parts having an overall mass lower than those same parts when they are made of metal material while having an at least equivalent, if not greater, mechanical strength.

In order to further increase the propulsion efficiency of the turbomachine, a solution in terms of aerodynamics consists in inclining the leading edge of the blades of the fan toward the upstream (with respect to the direction of flow of gas in the turbomachine). FIG. 1 shows a conventional fan blade 1 and FIG. 2 shows a modified fan blade 2 where the leading edge 3 has been inclined toward the upstream. Each of the blades 1, 2 comprises a root 4, an airfoil 5, a support 6 ensuring the transition between the root 4 and the airfoil 5. The airfoil 5 extends between the leading edge 3 and a trailing edge 7. The leading edge 3 of each blade 1, 2 can be provided with a metal foil 8 in order to protect it from the impacts of objects that can be ingested by the turbomachine in operation. The root 4 is intended to be housed in a corresponding groove provided in a rotary fan disk of the turbomachine. With the modified blade 2, the center of gravity 9 of the blade is shifted towards the leading edge 3 compared to that of the conventional blade 1. This displacement of the center of gravity modifies the distribution of the centrifugal forces in operation and causes in particular their concentration on the leading edge 3 side at the support 6. Such a concentration of forces is not desirable for having a robust blade.

One solution to overcome this concentration of forces would be to extend the root of the blade toward the upstream. This solution would however involve modifying the fan disk on which the blade is intended to be mounted, would tend to lengthen the disk and therefore to increase the mass thereof. The gains in efficiency obtained by the aerodynamically-shaped change of the blade would be reduced.

Another solution would be to add mass to the downstream of the airfoil in order to re-concentrate the center of gravity, for example by adding a metal foil on the trailing edge or a solid rod within the airfoil. Similarly, such a solution would increase the mass of the assembly and reduce the gains in efficiency obtained by the aerodynamically-shaped change of the blade.

There is therefore a need for a light and robust fan blade with improved aerodynamic efficiency.

SUMMARY

For this purpose, an aspect of the present invention proposes a fibrous texture intended to form the fibrous reinforcement of a turbomachine blade made of composite material comprising a fibrous reinforcement densified by a matrix, the texture being made in one piece and having a three-dimensional weaving between a plurality of warp yarns or strands made of at least first fibers extending along a longitudinal direction and a plurality of weft yarns or strands made of first fibers extending along a transverse direction, the texture comprising along the longitudinal direction a blade root portion, a blade airfoil portion and a blade support portion between the blade root portion and the blade airfoil portion.

According to an aspect of the invention, the blade support portion includes a first area extending transversely from a first edge of the texture intended to form a leading edge and a second area extending transversely from the first area up to a second edge of the texture intended to form a trailing edge, the first area comprising warp yarns or strands made of second fibers different from the first fibers, the second fibers having an elongation at break greater than that of the first fibers, the first area having a first volume ratio in yarns or strands made of second fibers strictly greater than a second volume ratio in yarns or strands made of second fibers in the second area.

Volume ratio in yarns or strands comprising given fibers in a texture portion means the ratio between the volume occupied by the yarns or strands comprising the fibers and the total volume occupied by all the yarns or strands in this portion. The yarns or strands may consist only of fibers of the same material. "Three-dimensional weaving" or "3D weaving" should be understood as a weaving mode whereby at least some of the warp yarns bind weft yarns on several weft layers. A reversal of the roles between warp and weft is possible in the present text and must be considered also as covered by the claims.

With such a fibrous texture, it is possible to produce a blade having its center of gravity displaced towards the leading edge in order to obtain improved aerodynamic performances and capable of holding the forces imposed by such geometry in the area of the support located in the vicinity of the leading edge. The greater elongation at break of the second fibers located in this area allows the blade which will comprise such a texture as a reinforcement to hold these forces without significantly increasing its mass (the mass of the second fibers is generally greater than that of the first fibers). The use of the second fibers for warp yarns or strands makes the manufacture of such a fibrous texture easy since it suffices to replace the warp yarns or strands made of first fibers with those made of second fibers before the weaving in a loom, as will be detailed later.

In one example of embodiment, the first area extends from the first edge over a distance less than or equal to 10% of the width of the texture measured in the transverse direction at the support portion. Such a disposition makes it possible to locate the yarns or strands made of second fibers in the most stressed area.

In one example of embodiment, the second area of the support portion may comprise a first portion adjacent to the first area comprising the warp yarns or strands made of second fibers and a second portion extending between the first portion and the second edge, a third volume ratio in yarns or strands made of second fibers in the first portion being comprised between the first volume ratio and the second volume ratio. The presence of this first portion which constitutes an intermediate area in the support portion between the first edge and the second edge makes it possible to gradually vary the stiffness of the blade between the leading edge and the trailing edge in order to prevent the sudden stiffness variations that may weaken the blade.

Particularly, the volume ratio in yarns or strands made of second fibers may decrease in the support portion away from the first edge of the fibrous texture.

In one example of embodiment, the first portion of the second area may extend transversely from the first area over a distance less than or equal to 20% of the maximum width of the texture measured in the transverse direction at the support portion.

In one example of embodiment, the warp yarns or strands made of second fibers may extend from the blade support preform in only one part of the blade airfoil portion. In addition, the warp yarns or strands made of second fibers may extend from the blade root portion. This disposition results from a manufacturing method wherein the warp yarns or strands made of second fibers, after having been woven in the blade root portion, in the support portion and in the blade portion, have come out of the fibrous texture to reduce its thickness and in order to gradually increase the stiffness of the blade at its end opposite to the root.

In one example of embodiment, the warp yarns or strands made of second fibers may be present only at the skin of the fibrous texture. Particularly, the yarns or strands made of second fibers may be present only on one side (or on one face) of the fibrous texture or on both sides (or on both faces) thereof. The inventors have indeed noticed that the stresses are located mainly in a layer at the surface of the blade. Such a disposition makes it possible to reduce the number of warp yarns or strands made of second fibers used and therefore the mass of the assembly. Such a disposition further allows, without inconvenience on the mass, preserving a sufficient stiffness in the vicinity of the blade root by using the greater stiffness of the first fibers in the core of the support.

In one example of embodiment, the first volume ratio may be of at least 40%.

In one example of embodiment, the third volume ratio may be of at least 20%.

In one example of embodiment, the material of the first fibers may be carbon and the material of the second fibers may be selected from the following: glass, basalt, aramid, polyester, or a combination of these materials.

In one example of embodiment, the material of the first fibers and of the second fibers may be carbon.

An aspect of the invention also relates to a fan blade made of composite material comprising a fibrous reinforcement densified by a matrix, the fibrous reinforcement of the blade consisting of a fibrous texture such as the one described above.

A method for manufacturing a fan blade made of composite material comprising a fibrous reinforcement densified by a matrix may comprise the following steps: a fibrous texture such as the one presented above is produced, the texture is shaped to obtain a blade preform, and a matrix is formed in the porosity of the preform to obtain the blade. The fibrous texture is obtained by three-dimensional weaving, and may for example have an interlock-type weave. The matrix may be an organic matrix and obtained from a resin. The matrix can thus be formed by resin injection molding (RTM or "Resin Transfer Molding" process).

Another aspect of the invention also relates to an aeronautical turbomachine comprising a fan provided with a plurality of blades as defined above.

BRIEF DESCRIPTION OF THE DRAWINGS

Other features and benefits of the present invention will become apparent from the description given below, with reference to the appended drawings which illustrate therefrom an example of embodiment without limitation. In the figures:

FIG. 1 shows a fan blade made of composite material according to the prior art,

FIG. 2 shows a fan blade made of composite material having an improved aerodynamic shape.

DETAILED DESCRIPTION

Figure 3:
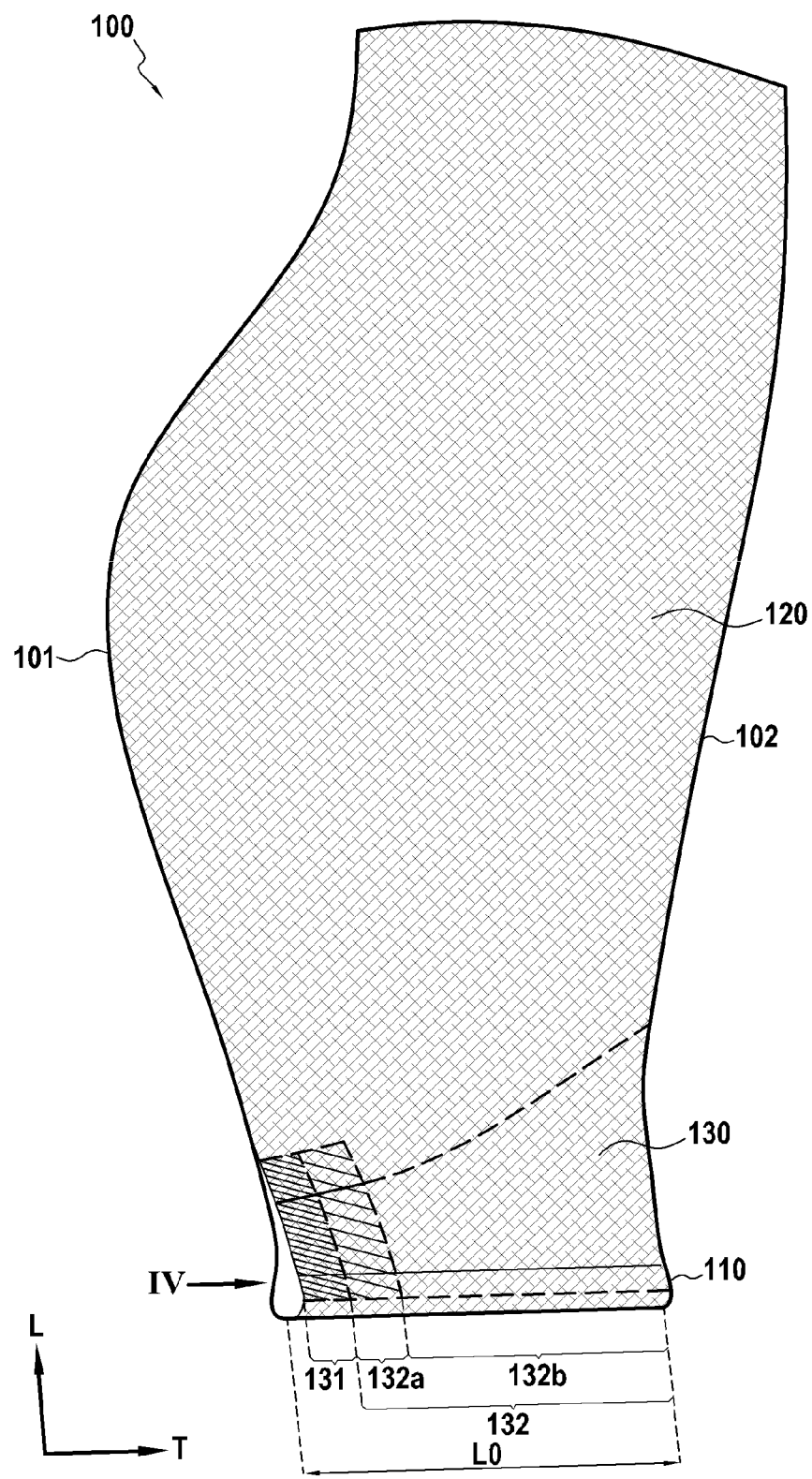
FIG. 3 shows a fibrous texture according to one embodiment of the invention.

FIG. 3 shows a schematic view of a fibrous texture 100 intended to form the fibrous reinforcement of a turbomachine blade made of composite material comprising a fibrous reinforcement densified by a matrix. This fibrous texture can be obtained for example by three-dimensional weaving in a Jacquard-type loom of a fibrous blank and cuts excess yarns of the woven fibrous blank.

The fibrous texture 100 may have a three-dimensional weaving, and comprise for example predominantly an interlock or multilayer weave. "Interlock weave" should be understood as a three-dimensional weaving pattern whose each layer of warp yarns binds several layers of weft yarns with all the yarns of the same warp column having the same movement in the plane of the weave. Document WO2006/136755 describes the production of such weaving patterns. As will be described later, this fibrous texture may be shaped and then densified to obtain a fan blade 2 such as the one illustrated in FIG. 2.

The fibrous texture 100 extends along a longitudinal direction L between a blade root portion 110 and a blade airfoil portion 120. A blade support portion 130 is present between the blade root portion 110 and the blade airfoil portion 120. In general, the blade root portion 110 is thicker than the blade support portion 130, and the thickness of the blade airfoil portion 120 is variable. The fibrous texture 100 extends along a transverse direction T between a first edge 101 intended to form the leading edge of the blade and a second edge 102 intended to form the trailing edge of the blade.

In the example illustrated, the longitudinal direction L also corresponds to the general direction along which the warp yarns extend in the fibrous texture 100, whereas the transverse direction T corresponds to the general direction along which the weft yarns extend. Note that throughout the text, warp and weft can be inverted. According to an embodiment of the invention, the weft yarns or strands and a majority of the warp yarns or strands comprise first fibers.

The blade support portion 130 ensures the transition in thickness between the blade root portion 110 and the blade airfoil portion 120. The blade support portion 130 extends, in the example illustrated, over a distance measured along the longitudinal direction greater at the second edge 102 than at the first edge 101.

According to an embodiment of the invention, the blade support portion 130 includes a first area 131 which extends along the transverse direction between the first edge 101 and a second area 132 which extends transversely from the first area 131 to the second edge 102. The first area 131 comprises warp yarns or strands made of second fibers different from the first fibers, the second fibers having an elongation at break strictly greater than that of the first fibers. Always according to an embodiment of the invention, the first area 131 has a first volume ratio in yarns or strands made of second fibers strictly greater than the volume ratio in yarns or strands made of second fibers in the second area 132. In other words, there are more warp yarns or strands made of second fibers relative to the total number of yarns or strands in the first area 131 than in the second area 132.

The first volume ratio may be greater than or equal to 40%. The first area 101 may extend from the first edge 101 over a distance of less than or equal to 10% of the maximum width L0 of the fibrous texture 100 at the support portion 130.

In the example illustrated, the second area 132 of the support portion 130 comprises a first portion 132a adjacent to the first area 131 within which warp yarns or strands made of second fibers are present, and a second portion 132b extending between the first portion 132a and the second edge 102, a third volume ratio in yarns or strands made of second fibers in the first portion 132a being comprised between the first volume ratio and the second volume ratio. The second portion 132b makes it possible to gradually vary the stiffness of the blade which will be manufactured from the fibrous texture of the leading edge towards the trailing edge. It will be noted that the volume ratio in yarns or strands made of second fibers within the first area 131 or the second area 132 may be variable. The volume ratio in warp yarns or strands made of second fibers may further gradually decrease between the first edge 101 and the second edge 102 of the fibrous texture.

The third volume ratio may be greater than or equal to 20%. The second portion 132b of the second area 132 may for its part comprise only warp yarns or strands made of first fibers. In this example, except at the first area 131 and at the first portion 132a, the fibrous texture 100 comprises only yarns or strands made of first fibers. The first portion 132a adjacent to the first area 131 may extend over a distance less than or equal to 20% of the maximum width L0 of the fibrous texture 100 measured in the transverse direction at the support portion 130.

In this example, the warp yarns or strands made of second fibers of the first area 131 and of the first portion 132a extend beyond the support portion 130 in only one part of the airfoil portion 120. This disposition allows ensuring a gradual stiffness transition between the support portion 130 and the end of the blade portion 120 opposite to the support portion 130. In this example, the warp yarns or strands made of second fibers of the first area 131 and of the first portion 132a also extend up to one end of the blade root portion 104, for easier weaving.

The material of the first fibers may be carbon. The material of the second fibers may be selected from the following: glass, basalt, aramid, polyester, or a combination of these materials. The following table gives common elongations at break of several fibers that can be used.

| material of the fibers - reference | elongation at break (%) |
|---|---|
| glass - AGY « S-2 Glass ® » | 5.2 |
| glass - « E-Glass » | 4.4 |
| polyester | 3.5 |
| basalt | 3 |
| aramid - Dupont « Kevlar ® 49 » | 2.4 |
| carbon - Toray « HS T700 » | 2.1 |
| carbon - Toray « HS TR30S » | 1.9 |
| carbon - Toray « HS T300 » | 1.5 |

For example, it is possible to select carbon for the first fibers and glass for the second fibers. It is also possible to use several types of warp yarns or strands which comprise different fibers having an elongation at break greater than that of the first fibers. It will be noted that the material of the first and second fibers may be identical. For example, the first and second fibers may be made of carbon, provided that their elongations at break are different. For example, it is possible to select first carbon fibers in HexTow®IM7 (marketed by the Hexcel Company), and second carbon fibers in Torayca® T1100 (marketed by the Toray Company).

The elongation at break of the first fibers may be for example less than or equal to 2.1%, and the one of the second fibers may be greater than or equal to 2.4%.

Figure 4:
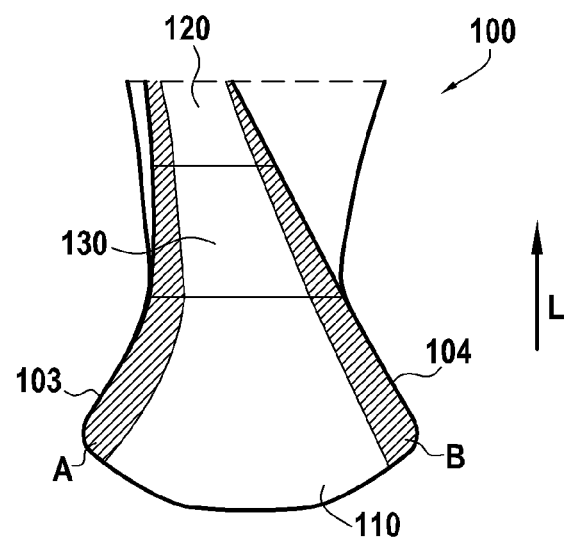
FIGS. 4 and 5 show variants of embodiment of a fibrous texture according to the invention.

FIG. 4 illustrates an embodiment of the invention wherein the yarns or strands made of second fibers are present only at the skin of the fibrous texture 100. FIG. 4 shows a view of the first edge 101 of the fibrous texture 100. "Yarns or strands present at the skin" means that the yarns or strands are present in a layer having a predetermined thickness located at the surface of the fibrous texture (the predetermined thickness being smaller than the total thickness of the fibrous texture at the considered location). In this view, it is possible to identify a first face 103 of the fibrous texture 100 intended to form a blade intrados face, and a second face 104 opposite to the first face intended to form a blade extrados face. In this example, the warp yarns or strands made of second fibers are located at the skin on the side of the first face 103 and on the side of the second face 104 (hatched portions A and B in FIG. 4). This disposition makes it possible to modify the stiffness of the blade only in the areas that are the most stressed, namely in layers at the surface thereof.

Figure 5:
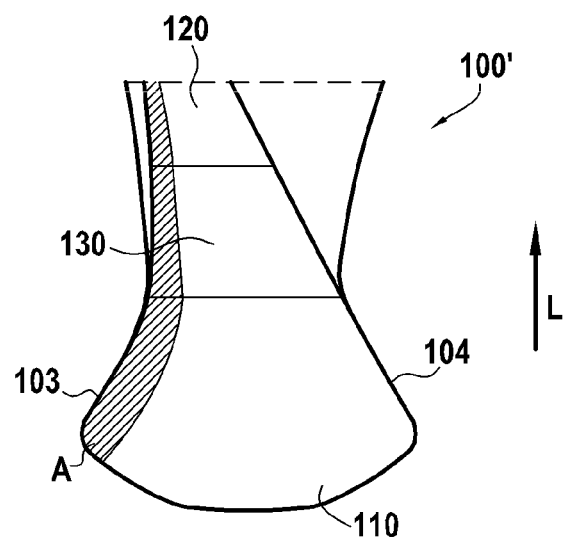

Alternatively, the warp yarns or strands made of second fibers may be present at the skin only on the first face 103 or on the second face 104. FIG. 5 shows a view similar to that of FIG. 4 of a fibrous texture 100' where the warp yarns or strands made of second fibers are located at the skin at the first face 103 (hatched portion A in FIG. 5). Those skilled in the art will select the most suitable location for these warp yarns or strands made of second fibers based on the geometry of the blade to be produced and on the stresses to which it will be subjected in operation.

Figure 6:
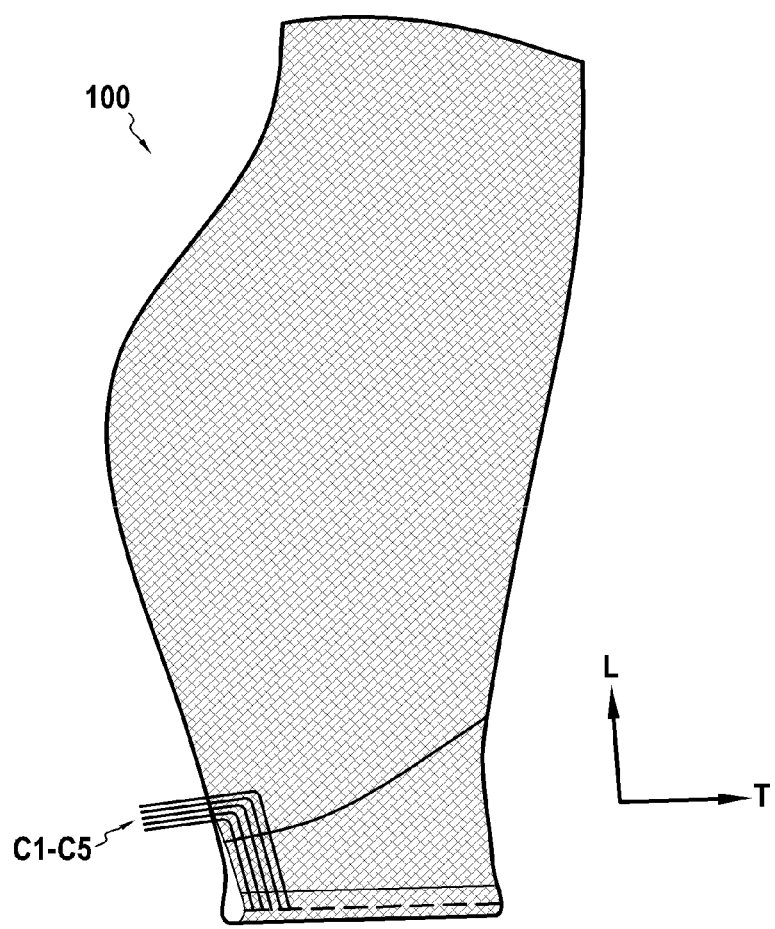
FIG. 6 illustrates a method for weaving a fibrous texture according to an embodiment of the invention.

FIG. 6 very schematically illustrates a way of weaving the fibrous texture 100 by limiting the presence of the warp yarns or strands made of second fibers to the aforementioned areas and portions. The fibrous texture is manufactured along the longitudinal direction L from the thickest portion corresponding to the root of the blade, towards the thinnest portion corresponding to the end of the blade opposite to the root of the blade. In order to reduce the thickness of the fibrous texture 100, the number of warp yarns or strands is gradually reduced. To do so, warp yarns or strands are gradually extracted from the texture at each decrease in thickness, the yarns or strands extracted are then cut. It is then beneficial to use warp yarns or strands made of second fibers from the weaving of the blade root portion 110 and then to gradually remove them from the fibrous texture once the support portion 130 passed. FIG. 6 schematically represents five C1-C5 warp yarns or strands that are woven from the blade root portion 110 up to a predetermined height of the blade root portion 120. It will also be noted that the warp yarns or strands made of second fibers can be removed from the fibrous texture 100 at different heights in order to be able to control the thickness of the fibrous texture 100 along the transverse direction T.

In order to obtain a fan blade 2 such as the one illustrated in FIG. 2, a fibrous texture 100 is produced by three-dimensional weaving, the texture is shaped to obtain a blade preform having the appropriate geometry (for example to obtain a blade with a trailing edge moved toward the upstream), and a matrix is formed in the porosity of the preform to obtain the blade. The fan blade 2 can be produced by a Resin Transfer Molding (RTM) process where the preform is placed in a mold having the shape of the blade and in which a resin is injected and then polymerized. In this context, the matrix may be an organic matrix and obtained from an epoxy-type resin.

Figure 7:
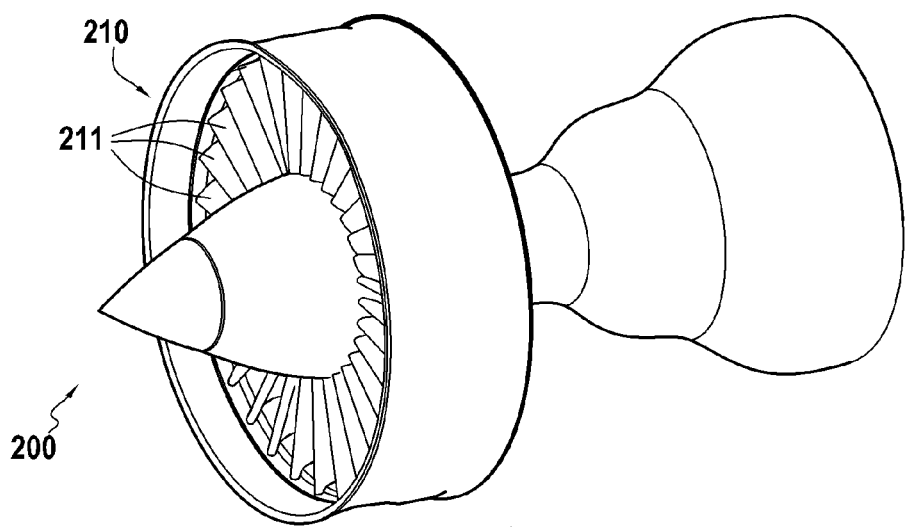
FIG. 7 shows an aeronautical turbomachine equipped with fan blades obtained from a fibrous texture according to an embodiment of the invention.

FIG. 7 shows an aeronautical turbomachine 200. Such a turbomachine 200 comprises a fan 210 disposed at the inlet of the engine provided with a plurality of blades 211. The blades 211 are here made of composite material having a fibrous reinforcement densified by a matrix. Such blades 211 can be obtained from a fibrous texture 100 according to an embodiment of the invention by a process such as the one described above.

The invention claimed is:

1. A fibrous texture intended to form a fibrous reinforcement of a turbomachine blade made of composite material comprising:

the fibrous reinforcement, which is densified by a matrix, a texture thereof being made in one piece and having a three-dimensional weaving between a plurality of warp yarns or strands made of at least first fibers extending along a longitudinal direction and a plurality of weft yarns or strands made of first fibers extending along a transverse direction, the texture comprising along the longitudinal direction a blade root portion, a blade airfoil portion and a blade support portion between the blade root portion and the blade airfoil portion, wherein the blade support portion includes a first area extending transversely from a first edge of the texture intended to form a leading edge and a second area extending transversely from the first area up to a second edge of the texture intended to form a trailing edge, the first area comprising warp yarns or strands made of second fibers different from the first fibers, the second fibers having an elongation at break greater than that of the first fibers, the first area having a first volume ratio in yarns or strands made of second fibers strictly greater than a second volume ratio in yarns or strands made of second fibers in the second area, the second area of the support portion comprising a first portion adjacent to the first area comprising the warp yarns or strands made of second fibers and a second portion extending between the first portion and the second edge, a third volume ratio in yarns or strands made of second fibers in the first portion being comprised between the first volume ratio and the second volume ratio.

2. The fibrous texture according to claim 1, wherein the first area extends from the first edge over a distance less than or equal to 10% of the width of the texture measured in the transverse direction at the support portion.

3. The fibrous texture according to claim 1, wherein the first portion of the second area extends transversely from the first area over a distance less than or equal to 20% of the maximum width of the texture measured in the transverse direction at the support portion.

4. The fibrous texture according to claim 1, wherein the warp yarns or strands made of second fibers extend from the blade support preform in only one part of the blade airfoil portion.

5. The fibrous texture according to claim 1, wherein the warp yarns or strands made of second fibers are present only at the skin of the fibrous texture and not in a central portion of the fibrous texture.

6. The fibrous texture according to claim 1, wherein the first volume ratio is of at least 40%.

7. The fibrous texture according to claim 1, wherein the material of the first fibers is carbon and the material of the second fibers is selected from the following: glass, basalt, aramid, polyester, or a combination of these materials.

8. A fan blade made of composite material comprising a fibrous reinforcement densified by a matrix, the fibrous reinforcement of the blade consisting of a fibrous texture according to claim 1.

9. An aeronautical turbomachine comprising a fan provided with a plurality of blades according to claim 8.

* * * * *